(12) United States Patent
Leibl

(10) Patent No.: US 8,915,326 B2
(45) Date of Patent: Dec. 23, 2014

(54) AXLE BEAM ARRANGEMENT ON A VEHICLE, IN PARTICULAR ON A MOTOR VEHICLE

(71) Applicant: Audi AG, Ingolstadt (DE)

(72) Inventor: Peter Leibl, Manching (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/890,495

(22) Filed: May 9, 2013

(65) Prior Publication Data

US 2013/0300157 A1 Nov. 14, 2013

(30) Foreign Application Priority Data

May 10, 2012 (DE) .......................... 10 2012 009567

(51) Int. Cl.
*B62D 21/11* (2006.01)
*B62D 21/02* (2006.01)
*B62D 25/08* (2006.01)

(52) U.S. Cl.
CPC ............... *B62D 25/08* (2013.01); *B62D 21/11* (2013.01)
USPC ...... 180/299; 296/203.02; 296/205; 180/300; 280/124.109

(58) Field of Classification Search
CPC ........ B60K 5/12; B60K 5/1208; B62D 21/08; B62D 21/09; B62D 21/11; B62D 21/15; B62D 21/152; B62D 21/155; B62D 25/08; B62D 25/085
USPC .......... 296/193.07, 193.09, 203.02, 204, 205; 267/140.11, 140.13; 180/299, 300; 280/124.109, 784
See application file for complete search history.

(56) References Cited

U.S. PATENT DOCUMENTS

| | | | |
|---|---|---|---|
| 3,927,730 A * | 12/1975 | Winslow | 180/271 |
| 4,440,435 A | 4/1984 | Norlin | |
| 4,531,761 A * | 7/1985 | von Sivers | 280/785 |
| 4,723,791 A * | 2/1988 | Miura et al. | 280/124.109 |
| 4,856,751 A * | 8/1989 | Ohba | 248/638 |
| 5,772,245 A | 6/1998 | Muhlhausen | |
| 6,298,936 B1 | 10/2001 | Yoshida | |
| 2006/0049603 A1* | 3/2006 | Katagiri et al. | 280/124.109 |
| 2006/0113784 A1* | 6/2006 | Kishima | 280/784 |
| 2006/0144631 A1 | 7/2006 | Kim | |
| 2008/0029942 A1* | 2/2008 | Kern | 267/140.13 |

FOREIGN PATENT DOCUMENTS

| | | |
|---|---|---|
| DE | 31 46 554 | 7/1982 |
| DE | 4213789 | 10/1993 |
| DE | 195 10 763 | 9/1995 |
| DE | 100 07 789 | 8/2000 |
| DE | 102005056678 | 7/2006 |
| DE | 102010036043 | 3/2011 |
| JP | 2004034877 | 2/2004 |

* cited by examiner

*Primary Examiner* — Glenn Dayoan
*Assistant Examiner* — Jason S Daniels
(74) *Attorney, Agent, or Firm* — Henry M Feiereisen LLC

(57) ABSTRACT

An axle beam arrangement on a vehicle, in particular a motor vehicle, has two longitudinal beams and at least one cross beam connecting the two longitudinal beams. At least one of the beams has in an installation state of the vehicle a clearance between the beam stop region and a vehicle-side stop structure, in particular a body structure. The beam has in the beam stop region at least one stop and reinforcing element which reinforces the beam stop region and which is constructed and arranged so that it comes into supporting contact with the stop structure when the beam moves toward the stop structure.

21 Claims, 4 Drawing Sheets

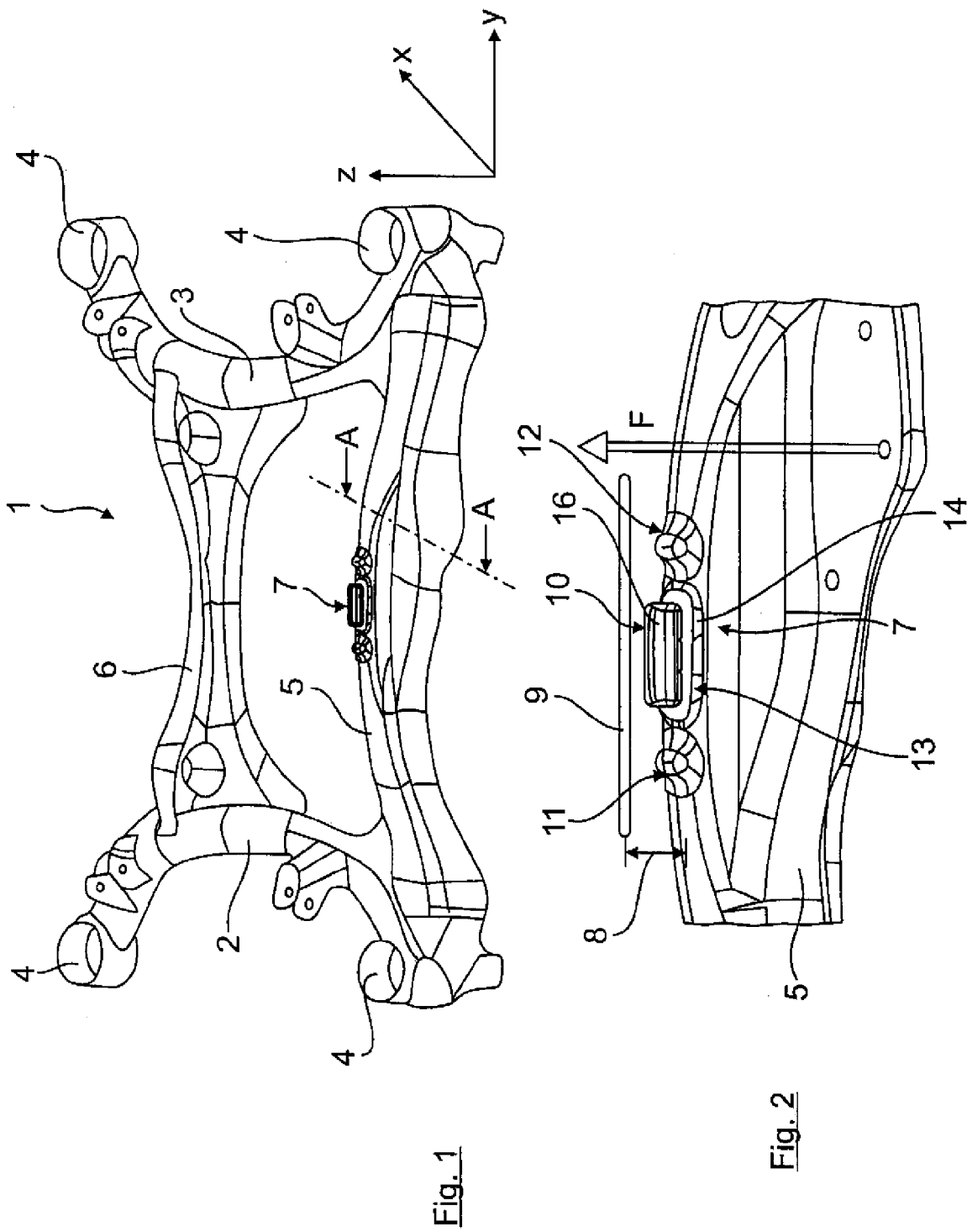

AXLE BEAM ARRANGEMENT ON A VEHICLE, IN PARTICULAR ON A MOTOR VEHICLE

CROSS-REFERENCES TO RELATED APPLICATIONS

This application claims the priority of German Patent Application, Serial No. 10 2012 009 567.8, filed May 10, 2012, pursuant to 35 U.S.C. 119(a)-(d), the content of which is incorporated herein by reference in its entirety as if fully set forth herein.

BACKGROUND OF THE INVENTION

The present invention relates to an axle beam arrangement on a vehicle, in particular on a motor vehicle.

The following discussion of related art is provided to assist the reader in understanding the advantages of the invention, and is not to be construed as an admission that this related art is prior art to this invention.

Such axle beams, also referred to as subframes, are well known and are generally composed of two longitudinal beams, which in the assembled state of the axle beam are oriented substantially in the longitudinal direction of the vehicle and which are connected to each other via at least one cross beam substantially aligned in the transverse direction of the vehicle. As a rule, such an axle beam has two cross beams connecting the longitudinal beams, which are spaced apart from each other in the longitudinal direction of the vehicle or the direction of travel. Usually, a transmission is mounted on the cross beam, wherein at least one bearing location is disposed on each cross beam. The top cross beam regions of these cross beams may have a clearance gap to allow sufficient movement relative to, for example, components or body parts arranged above which will be referred to herein as vehicle stop structure. Due to the arrangement of the transmission mount on the cross beams, stress during the vehicle operation, in particular during start-up, occurs in the vertical direction, wherein the cross beams are designed to remain below the plasticizing limit of the material. All the forces must here be supported by the cross beam, wherein in particular open cross beams, that is cross beams having, for example, a U-shaped cross section, may be subjected to significant stress in the transverse cross beam support, which in turn determines the wall thickness. Such cross beams thus typically have a relatively large wall thickness, which disadvantageously increases their weight.

The same applies likewise to the force introduction points of the longitudinal beam(s). Such force introduction points, hereinafter always referred to as brackets, may be for example steering brackets which come to rest on corresponding vehicle stop structures by bridging a gap distance, when a corresponding force is applied in an transverse direction of the vehicle. The peak load thus also determines the wall thickness in these areas.

According to the above discussion, the design of an axle beam thus requires a significant quantity of material, which leads to overall very heavy axle beam arrangements which increase the vehicle weight.

It would therefore be desirable and advantageous to obviate prior art shortcomings and to provide an improved axle beam arrangement on a vehicle, especially a motor vehicle, capable of absorbing force peaks without plastic deformation of the axle beam and which has in addition a simple design and a low weight with a relatively small component wall thickness.

SUMMARY OF THE INVENTION

According to one aspect of the present invention, an axle beam arrangement on a vehicle, in particular on a motor vehicle, is proposed, which includes two longitudinal beams and at least one cross beam interconnecting the two longitudinal beams. At least one of the beams has in the assembled or ground state of the vehicle with a defined beam stop region a gap distance as clearance relative to a vehicle-side stop structure associated with beam stop region, which is formed in particular by a body structure of the vehicle. According to the invention, the at least one beam is provided in the beam stop region with at least one stop and reinforcing element, which reinforces the beam stop region and which is formed and/or arranged so as to cause a supporting contact on the stop structure when the cross beam moves relative towards the stop structure.

With this axle beam arrangement according to the invention, specific reinforced support points are provided in the most stressed stop regions of a beam of an axle beam, in particular a cross beam, which reliably prevents plasticizing or deformation of the beam in this highly stressed region due to force peaks occurring with the aforedescribed stop situation, wherein the remaining beam can then be constructed with a significantly reduced component wall thickness, thus reducing the total weight of the axle beam.

According to an advantageous feature of the present invention, at least one beam provided with at least one stop and reinforcing element may be constructed as an open beam, in particular as a beam having a U-shaped cross-section, since this beam is usually constructed to be less rigid than a beam having a closed profile. However, depending on the loads and fields of application, the inventive solution may also be used with beams having closed cross-sections.

According to another advantageous feature of the present invention, the at least one stop and reinforcing element may be made of a material that is rigid compared to an elastomer material, which is formed by a separate component and which is materially and/or non-positively and/or positively connected with the beam or which is alternatively formed as a component connected with the beam and constructed from the same material and/or in one piece. Such a stop and reinforcing element made from a rigid material enables excellent local stiffening of the respective support area with a relatively low material consumption and/or a low parts count. For example, such a rigid stop and reinforcing element can be formed from the beams during its production. For an especially advantageous force dissipation from and force introduction force into the beam region, the rigid stop and reinforcing element may advantageous be designed as a pin that is flat or spherically rounded at its top side facing the stop structure.

feature of the present invention, the at least one stop and reinforcing element may alternatively or in addition be formed as an elastic stop and reinforcing element made at least partially of an elastically deformable material, which is connected directly or indirectly with the beam. Such an elastic stop and reinforcing element enables excellent cushioning and damping of a stop, wherein the deformation and/or damping rate can be reliably defined or adjusted by the choice of material.

According to another advantageous feature of the present invention, the elastic stop and reinforcing element may be formed from or may include an elastomer body, wherein the elastomer body is connected to the beam stop region. This can generally be accomplished in different ways. In one advantageous embodiment, the elastomer body may be applied, for example attached, on a raised supporting web which reinforces the beam stop region and which is made of a rigid material and/or formed from the beam. This structure ensures that the supporting point is reliable reinforced by the supporting web made of a rigid material and that the reinforced support web simultaneously serves as a base or platform for applying the elastomer body. The elastomer body may be fixedly connected with the associated beam stop region, for example by a material connection. In addition, particularly in conjunction with the previous detailed description of the support web, the elastomer body may also be positively fitted on the supporting web and retained thereon by a material connection.

According to the above description, in the aforedescribed preferred embodiment the elastomer body may face the vehicle-side connection structure. Particularly advantageous supporting and damping results have been obtained when the elastic stop and reinforcing element has an overall elongated rod shape.

According to another advantageous feature of the present invention, several spaced-apart and/or differently constructed stop and reinforcing elements may be arranged in the beam stop region, wherein at least one rigid stop and reinforcing element made of a rigid material is associated with the at least one elastic stop and reinforcing element. In particular, such combination of a rigid stop and reinforcing element with an elastic stop and reinforcing element enables a particularly preferred embodiment, wherein the elastic stop and reinforcing element extends beyond the rigid stop and reinforcing element in the effective direction, such that the elastic stop and reinforcing element reaches a limit stop on the vehicle-side stop structure before the rigid stop and reinforcing element. This means that the rigid stop and reinforcing element comes in contact with the stop structure only after exceeding a defined, predeterminable compressive excursion of the elastic stop and reinforcing element. This produces a particularly advantageous, stepped and intentionally attenuated stop situation of the axle beam on the associated vehicle-side stop structures.

According to another advantageous feature of the present invention, in particular in conjunction with an arrangement on a cross beam, an elastic stop and reinforcing member may be arranged, as viewed in the lengthwise direction of a beam, between two fixed stop and reinforcing elements. Thus, an identical stop situation may be provided on both sides of the elastic stop and reinforcing element, which in a stop situation results in an advantageous bilateral force introduction and hence support situation.

As stated earlier, the implementation of the technical teaching of the invention is particularly advantageous in an application where the beam stop region is formed by a, as seen in the vehicle vertical axis direction, top-side cross beam stop region, above which a vehicle-side stop structure is arranged with a gap distance. As already stated above, this causes, due to the arrangement of the transmission mount on the cross beam, particularly high stress on the components, potentially leading to deformation of the cross beam, which is now advantageously prevented by the inventive solution. In this context, in a particularly preferred embodiment, the beam stop region is arranged in a central region of the cross beam between two longitudinal beams.

Alternatively, however particularly in addition to the supports on the cross beams in the direction of the vertical vehicle axis, additional stops may advantageously be implemented in the transverse direction of the vehicle, especially at force introduction points or brackets, so as to limit the total displacement of the axle beam and/or to limit or avoid elastic deformations under load and/or plasticizing. For this purpose, the beam stop region may be formed by a bracket which forms a component of a longitudinal beam or which is connected to a longitudinal beam, in particular a steering bracket, with which a vehicle-side stop structure is associated, preferably as viewed in the transverse direction of the vehicle. This may be a stop acting outwardly, i.e. toward the outside of the vehicle, and/or a stop acting inwardly, i.e. towards the center of the vehicle. Particularly preferred is an embodiment wherein the beam stop region is formed by a bracket-side angled section.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows schematically a perspective top view of an exemplary embodiment of an axle beam according to the present invention, FIG. 2 shows an enlarged detail of the axle beam according to FIG. 1 in a region of the cross beam having a defined support point, together with an associated vehicle body structure.

DETAILED DESCRIPTION OF PREFERRED EMBODIMENTS

Figure 3:
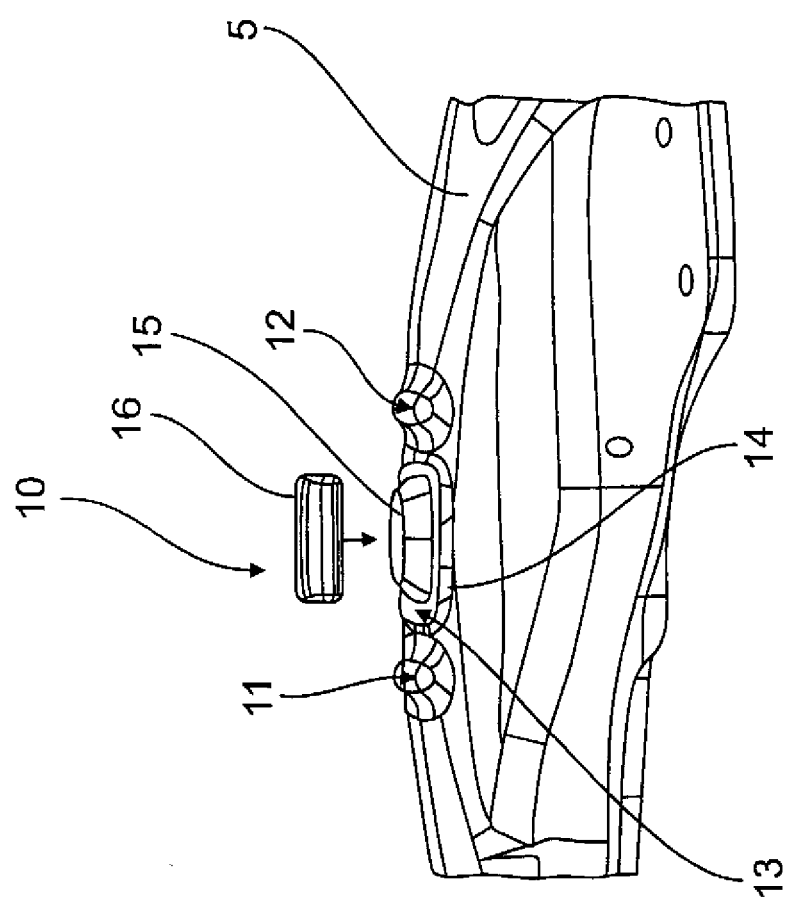
FIG. 3 shows schematically a diagram corresponding to FIG. 2 with a raised elastomer body.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exemplary embodiment of an axle beam 1 according to the present invention for an unillustrated vehicle, in particular a motor vehicle, for example a passenger car.

This axle beam has two longitudinal beams 2, 3 substantially aligned in the direction of travel, which each have connecting points 4 arranged at respective opposite end regions, at which the axle beam 1, for example by way of unillustrated rubber-metal bearing, is connected to the likewise unillustrated body.

The two longitudinal beams 2, 3 are connected transversely to the vehicle's longitudinal direction x and hence in the vehicle's transverse direction y by way of two cross beams 5, 6 that are mutually spaced apart in the vehicle's longitudinal direction x. The longitudinal beams 2, 3, like the cross beams 5, 6, may be made of a steel material, wherein in the present example of FIG. 1 the front cross beam 5 in the image plane of FIG. 1 has in the central region relative to the two lateral longitudinal beams 2, 3 a transverse beam stop region 7. FIG. 2 shows more particularly in an enlarged detailed view of the cross beam stop region 7 that the top-side cross beam stop region 7 has a gap distance 8 as clearance to a body structure 9 associated with the cross beam stop region 7 and arranged above the cross beam 5 and forming a vehicle-side stop structure. FIG. 2 shows an axle beam arrangement in the installation state or ground state.

As shown more particularly in FIGS. 2 and 3, the cross beam stop region 7 includes a center elastic stop and reinforcing element 10 with a substantially cylindrical or rod shape, which extends substantially in the longitudinal direction of the cross beam and thus in the vehicle's transverse direction y. Rigid stop and reinforcing members 11, 12 which are spaced from each other in the longitudinal direction of the cross beam are associated with this elastic stop and reinforcing element 10 at the two end regions.

Specifically, the elastic stop and reinforcing element 10 includes in the cross-beam-side connection region a bottom-side support web 13 which is preferably formed from the cross beam 5, but is always formed from a rigid material such as steel. An elastomer body 16 may be placed on this support web 13, which may have a plate-shaped base 14 and a raised mounting clamp 15 (see FIG. 3), so that the mounting clamp 15 is received in the elastomer body 16, which may in turn, for example, be fixedly connected by a material connection, such as an adhesive joint, with the mounting clamp 15 and/or with the plate-shaped base 14 of the supporting web 13.

Figure 5A:
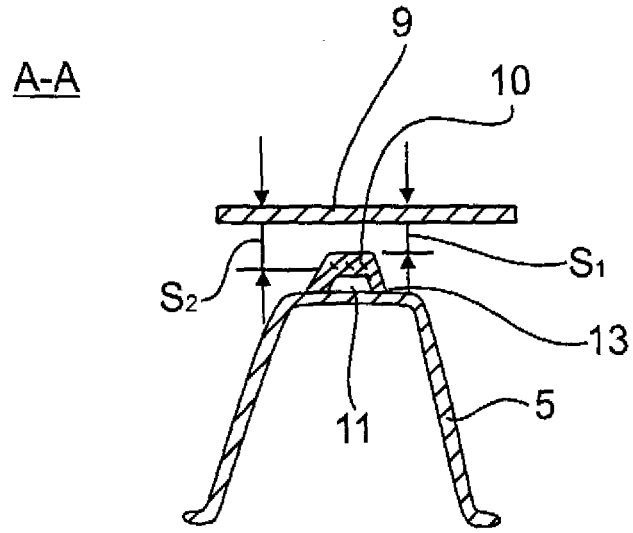
FIGS. 5a to 5c show schematically a cross section along the line A-A of FIG. 1 at different relative positions of the body structure and the cross beam.

As illustrated also in particular in FIG. 5a, which shows a cross-section along the line A-A through the cross beam 5 constructed as an open U-profile, the elastomer body 16 extends beyond the two rigid stop and reinforcing elements 11, 12, of which only one is shown in FIG. 5a, in the operative direction and hence here in the vehicle's vertical axis direction z, wherein the stop and reinforcing elements 11, 12 are formed as pin-shaped projections with a spherical top.

Figure 5B:
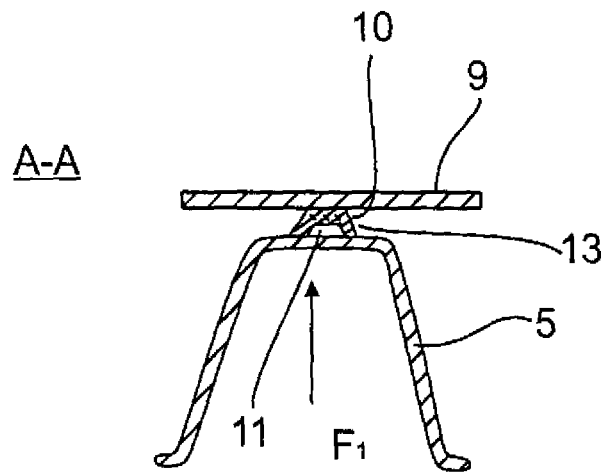

This construction and arrangement ensures that when the cross beam 5 and the body structure 9 move towards each other, by bridging the clearance $S_1$, the elastomer body 16, as shown in FIG. 5b, makes contact with the body structure 9 first. This is shown schematically in the FIG. 5b by the force arrow F1.

Figure 5C:
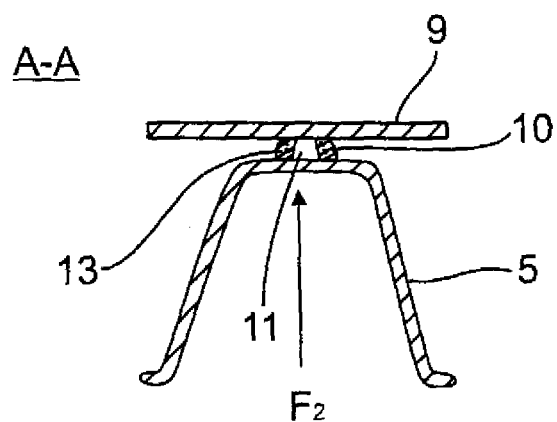

However, when a force is applied in accordance with the force arrow F2 of FIG. 5c, wherein the elastomer body 16 is compressed, the body structure 9 makes contact with the two rigid stop and reinforcing elements after a predefined displacement path $s_2$ (see FIG. 5a), causing the load to be intercepted not only by the elastic stop and reinforcing element 10, but additionally also by the rigid stop and reinforcing elements 11, 12. This advantageously supports and introduces the force into the cross beam, wherein the arrangement of the rigid and elastic stop and reinforcing elements 10, 11, 12 reinforces and stabilizes the cross beam stop region 7, preventing it from being deformed even under very high applied forces. Due to these inventive support points in the form of the elastic and rigid stop and reinforcing elements 10, 11, 12, the other wall portion of the cross beam may designed to be relatively thin, because the design of the inventive support points in the particularly stressed region ensures that precisely the portion potentially be at risk for plastic deformation is reinforced.

Although not explicitly shown in the exemplary embodiment of FIGS. 1 to 5, such aforedescribed cross beam stop region 7 may also be provided in conjunction with the cross beam 6.

Figure 4:
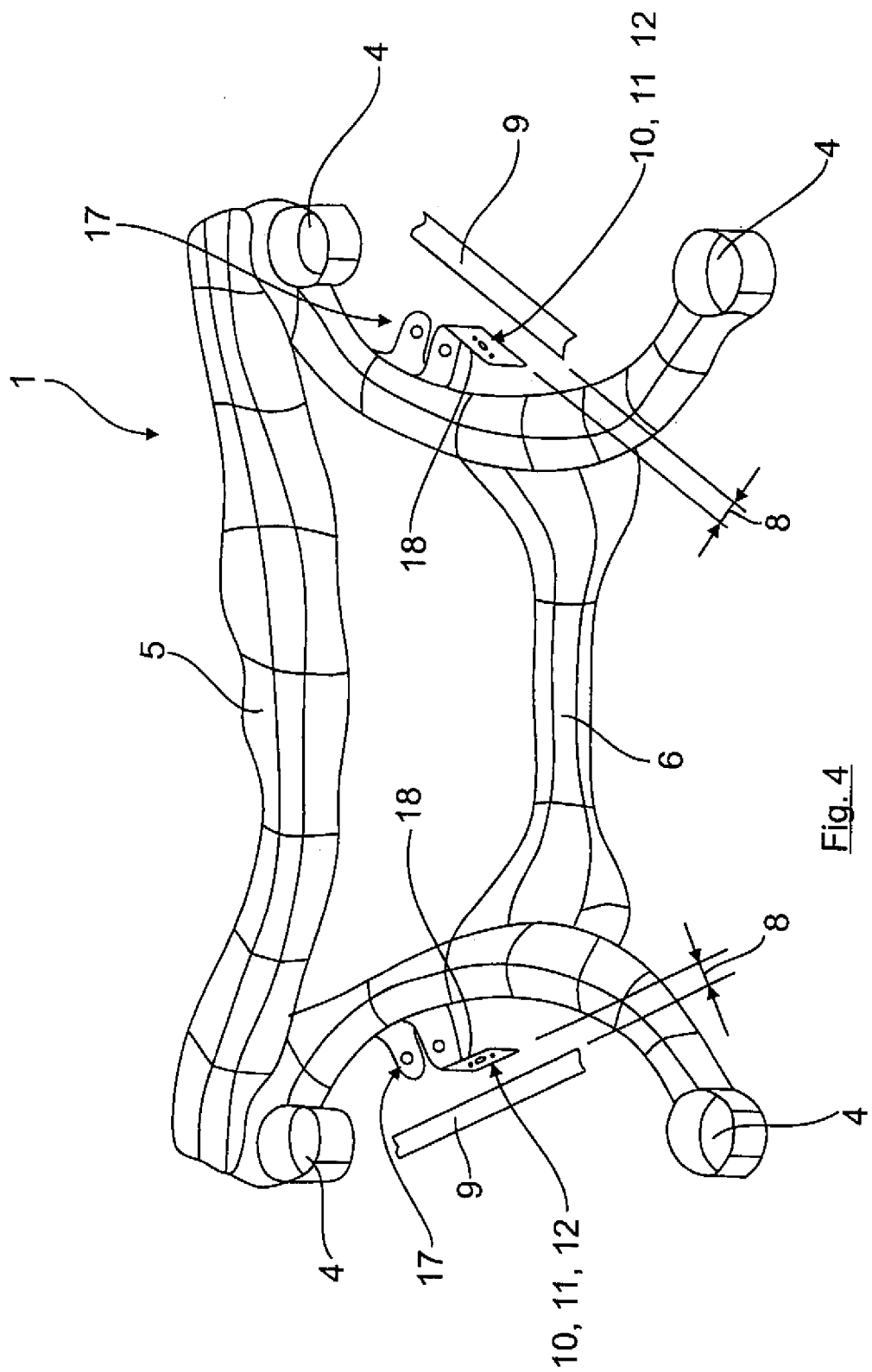
FIG. 4 shows schematically a bottom view of the axle beam shown in FIG. 1 with bracket-side support points.

FIG. 4 lastly shows a bottom view of the axle beam 1 according to FIG. 1, which very schematically illustrates in conjunction with steering brackets 17 a support point arrangement according to the invention. For example, the brackets may have angled portions 18 having a flat side aligned substantially in the vehicle's transverse direction y and associated with a body structure 9 by forming a gap distance 8. Like the cross beam stop region 7, support points may be formed by elastic stop and reinforcing elements 10 and rigid stop and reinforcing elements 11, 12 on the angled portions 18, which have the same effect and function with respect to the body structure 9 as previously described in conjunction with FIGS. 5a and 5c. Accordingly, in addition to the support points on the cross beams 5 and 6 in the vehicle's vertical axis, additional stops may be added in the vehicle's transverse direction y in order to limit the generated elastic deformations.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:
1. An axle beam arrangement on a vehicle, comprising:
two longitudinal beams,
at least one cross beam interconnecting the two longitudinal beams,
a beam stop region disposed in a center region of a cross beam located between the two longitudinal beams,
wherein at least one of the beams has in an installation state or a ground state of the vehicle a gap distance defining a clearance between the beam stop region and a vehicle-side stop structure associated with the beam stop region,
wherein the at least one beam comprises at least one stop and reinforcing element disposed in the beam stop region and reinforcing the beam stop region, wherein the at least one stop and reinforcing element is constructed and arranged so as to produce a supporting contact on the vehicle-side stop structure when the at least one beam and the vehicle-side stop structure move toward each other, and
wherein the beam stop region is formed by a top-side cross beam stop region as defined in relation to a vertical axis of the vehicle, above which the vehicle-side stop structure is disposed with the gap distance.

2. The axle beam arrangement of claim 1, wherein the vehicle is a motor vehicle.

3. The axle beam arrangement of claim 1, wherein the vehicle-side stop structure is a body structure.

4. The axle beam arrangement of claim 1, wherein the at least one beam is formed as an open beam.

5. The axle beam arrangement of claim 4, wherein the open beam has a U-shaped cross-section.

6. The axle beam arrangement of claim 1, wherein the at least one stop and reinforcing member is made of a rigid material which is formed by a separate component connected to the at least one beam by a connection selected from a material connection, a non-positive connection, a positive connection.

7. The axle beam arrangement of claim 1, wherein the at least one stop and reinforcing member is made of a rigid material which is formed as a single-material component with the at least one beam or is connected with the at least one beam in one single piece.

8. The axle beam arrangement of claim 1, wherein the rigid stop and reinforcing element is pin-shaped and is flattened or spherically rounded at a top side facing the vehicle-side stop structure.

9. The axle beam arrangement of claim 1, wherein the at least one stop and reinforcing element is formed as an elastic stop and reinforcing element and is at least partially made of an elastically deformable material that is indirectly or directly connected the at least one beam.

10. The axle beam arrangement of claim 9, wherein the elastic stop and reinforcing element comprises an elastomer body which is connected to the beam stop region.

11. The axle beam arrangement of claim 10, wherein the elastomer body is applied on a raised supporting web which reinforces the beam stop region and is made of a rigid material.

12. The axle beam arrangement of claim 10, wherein the elastomer body is fitted on or materially connected to a supporting web formed from the at least one beam.

13. The axle beam arrangement of claim 10, wherein the elastomer body faces the vehicle-side stop structure.

14. The axle beam arrangement of claim 10, wherein the elastic stop and reinforcing element has a generally elongated rod shape.

15. The axle beam arrangement of claim 1, wherein the beam stop region is formed by a bracket which forms a part of a longitudinal beam or which is connected to a longitudinal beam, and wherein the vehicle-side stop structure associated with the beam stop region is formed by an angled portion facing the bracket-side.

16. The axle beam arrangement of claim 15, wherein the bracket comprises a steering bracket.

17. An axle beam arrangement on a vehicle, comprising:
two longitudinal beams,
at least one cross beam interconnecting the two longitudinal beams,
a beam stop region,
wherein at least one of the beams has in an installation state or a ground state of the vehicle a gap distance defining a clearance between the beam stop region and a vehicle-side stop structure associated with the beam stop region,
wherein the at least one beam comprises a plurality of spaced apart or differently shaped stop and reinforcing elements disposed in the beam stop region and reinforcing the beam stop region, wherein the stop and reinforcing elements are constructed and arranged so as to produce a supporting contact on the vehicle-side stop structure when the at least one beam and the vehicle-side stop structure move toward each other,
wherein the stop and reinforcing elements are formed as elastic stop and reinforcing elements and are at least partially made of an elastically deformable material that is indirectly or directly connected the at least one beam,
wherein at least one rigid stop and reinforcing element made of a rigid material is associated with the at least one elastic stop and reinforcing element.

18. The axle beam arrangement of claim 17, wherein at least one elastic stop and reinforcing element and the at least one rigid stop and reinforcing element are constructed and arranged on the beam stop region such that the at least one elastic stop and reinforcing element extends beyond the at least one rigid stop and reinforcing element in an operating direction, causing the at least one elastic stop and reinforcing element to come into contact with the vehicle-side stop structure before the at least one rigid stop and reinforcing element, wherein the at least one rigid stop and reinforcing element comes into contact with the vehicle-side stop structure only after the at least one elastic stop and reinforcing element has exceeded a defined compressive travel.

19. The axle beam arrangement of claim 18, wherein, as viewed in a lengthwise beam direction, a resilient stop and reinforcing element is arranged between two rigid stop and reinforcing elements.

20. An axle beam for an axle beam arrangement on a vehicle, comprising:
at least one stop and reinforcing element arranged in a beam stop region disposed in a center region the axle beam and reinforcing the beam stop region,
wherein the at least one stop and reinforcing element has in an installation state or a ground state of the vehicle a gap distance defining a clearance between the beam stop region and a vehicle-side stop structure associated with the beam stop region,
wherein the at least one stop and reinforcing element is constructed and arranged so as to produce a supporting contact on a vehicle-side stop structure when the at least one axle beam and the vehicle-side stop structure move toward each other, and
wherein the beam stop region is formed by a top-side cross beam stop region, as defined in relation to a vertical axis of the vehicle, above which the vehicle-side stop structure is disposed with the gap distance.

21. An axle beam arrangement on a vehicle, comprising:
two longitudinal beams,
at least one cross beam oriented in the vehicle's transverse direction and interconnecting the two longitudinal beams,
a beam stop region disposed on the longitudinal beams,
wherein at least one of the longitudinal beams has in an installation state or a ground state of the vehicle a gap distance defining a transverse clearance between the beam stop region and a vehicle-side stop structure associated with the beam stop region,
wherein the at least one longitudinal beam comprises at least one stop and reinforcing element disposed in the beam stop region and reinforcing the beam stop region, wherein the at least one stop and reinforcing element is constructed and arranged so as to produce a supporting contact on the vehicle-side stop structure when the at least one beam and the vehicle-side stop structure move toward each other in the vehicle's transverse direction.

* * * * *